M. MOON.
REFRIGERATOR.
No. 182,126. Patented Sept. 12, 1876.
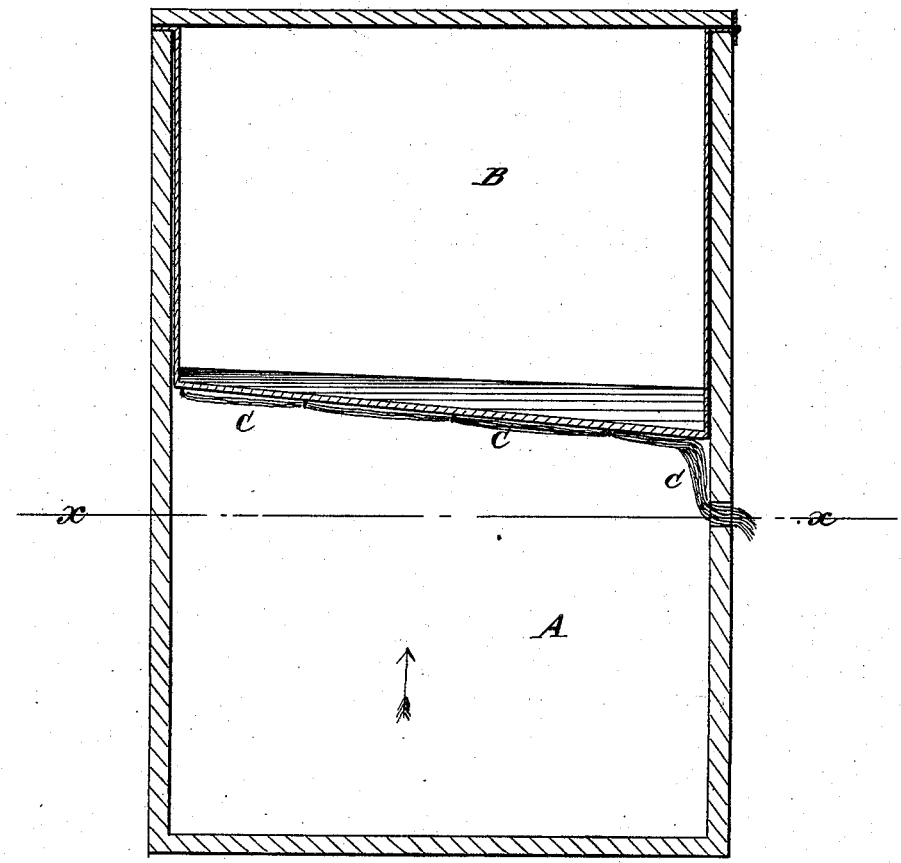
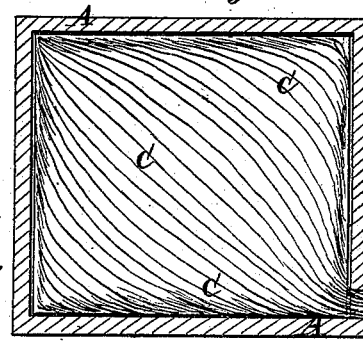

UNITED STATES PATENT OFFICE.

MAHLON MOON, OF MORRISVILLE, PENNSYLVANIA.

IMPROVEMENT IN REFRIGERATORS.

Specification forming part of Letters Patent No. 182,126, dated September 12, 1876; application filed July 11, 1876.

*To all whom it may concern:*

Be it known that I, MAHLON MOON, of Morrisville, in the county of Bucks and State of Pennsylvania, have invented a new and useful Improvement in Fruit-Houses, Refrigerators, &c., of which the following is a specification:

Figure 1 is a vertical section of a refrigerator illustrating my invention, and Fig. 2 is a horizontal section of the same taken through the line $x$ $x$, Fig. 1.

Similar letters of reference indicate corresponding parts.

The object of this invention is to obtain a cool and dry atmosphere in a simple and effective manner in fruit-houses, refrigerators, and other apartments where fruit, vegetables, provisions, &c., are kept which would be injured by moisture.

The invention consists in the employment in a preserving-chamber, and upon or near the surface of the partition between said chamber and the ice-chamber, of a fibrous or absorbent material to collect and carry off the moisture condensed from the air in said chamber, as hereinafter fully described.

A represents the apartment or chamber in which fruits or other articles are to be kept. B represents the chamber for the ice, which may be above or at the side of the chamber A, as may be desired or convenient. The partition between the chambers A B, when the chamber B is placed above the chamber A, should be somewhat inclined, for the purpose of more quickly carrying off the water from the melting ice, as well as that from condensation. To or near the surface of the partition, between the chambers A B and within the chamber A, is secured a textile, fibrous, or absorbent material, C, such as felt, cloth, untwisted rope, flax, hemp, or other material that will collect moisture condensed from the atmosphere.

The water of condensation may be deposited in a vessel in the chamber A, or carried out by a trap through a hole in the wall of the said chamber. In this way the air in the chamber A will be kept dry as well as cool, so that the articles within said chamber will not be injured by moisture.

Having thus described my invention, what I claim as new, and desire to secure by Letters Patent, is—

In a preserving-chamber, a fibrous or absorbent material secured upon or near the surface of a partition between said chamber and the ice-chamber, for the purpose of collecting and carrying off the moisture condensed from the air in said chamber, substantially as herein shown and described.

MAHLON MOON.

Witnesses:
JAMES T. GRAHAM,
JAMES H. HUNTER.